US010564777B2

(12) United States Patent
Sasagawa et al.

(10) Patent No.: US 10,564,777 B2
(45) Date of Patent: Feb. 18, 2020

(54) DISPLAY DEVICE AND INPUT DEVICE

(71) Applicant: PANASONIC INTELLECTUAL PROPERTY MANAGEMENT CO., LTD., Osaka (JP)

(72) Inventors: Yuma Sasagawa, Aichi (JP); Masaki Kontani, Osaka (JP); Takeshi Masutani, Osaka (JP); Wahei Agemizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/170,646

(22) Filed: Oct. 25, 2018

(65) Prior Publication Data

US 2019/0129573 A1    May 2, 2019

(30) Foreign Application Priority Data

Nov. 2, 2017   (JP) .................................. 2017-212708

(51) Int. Cl.
*G06F 3/042*    (2006.01)
*H01H 13/02*    (2006.01)
*F21V 8/00*    (2006.01)

(52) U.S. Cl.
CPC ........... *G06F 3/0421* (2013.01); *G02B 6/002* (2013.01); *G02B 6/0055* (2013.01); *H01H 13/023* (2013.01); *H01H 2219/06* (2013.01); *H01H 2219/062* (2013.01)

(58) Field of Classification Search
CPC ..... G06F 3/0421; G02B 6/002; G02B 6/0055; H01H 13/023; H01H 2219/062; H01H 2219/06
See application file for complete search history.

(56) References Cited

U.S. PATENT DOCUMENTS 9,470,922 B2   10/2016 Otake et al.

FOREIGN PATENT DOCUMENTS

JP    2012-113001    6/2012

*Primary Examiner* — Abhishek Sarma
(74) *Attorney, Agent, or Firm* — Greenblum & Bernstein, P.L.C.

(57) ABSTRACT

A display device including (i) a light source and (ii) a light guide body which guides light emitted by the light source, and includes: a light guide leg that guides the light entering through a light entrance surface; and a light exit portion connected to the light guide leg and including a reflection design portion which reflects, in a first direction, a portion of the light guided by the light guide leg and another reflection design portion which reflects, in the first direction, another portion of the light. When viewed in the first direction, the reflection design portion is disposed in a first region on a second direction side with respect to a connecting portion of the light exit portion connected to the light guide leg, and the other reflection design portion is disposed in a second region on a third direction side with respect to the connecting portion.

17 Claims, 10 Drawing Sheets

DISPLAY DEVICE AND INPUT DEVICE

CROSS REFERENCE TO RELATED APPLICATION

The present application is based on and claims priority of Japanese Patent Application No. 2017-212708 filed on Nov. 2, 2017.

BACKGROUND

1. Technical Field

The present disclosure relates to a display device and an input device.

2. Description of the Related Art

Japanese Unexamined Patent Application Publication No. 2012-113001 discloses a push switch which causes a light guide body to guide light emitted by a light source to display a predetermined design.

SUMMARY

However, the technique according to Japanese Unexamined Patent Application Publication No. 2012-113001 can be improved upon.

In view of this, the present disclosure provides a display device and an input device which are capable of improving upon the above related art.

A display device according to one aspect of the present disclosure is a display device which includes: a guided-light source which includes a first guided-light source that emits first light to be guided; and a light guide body which guides the first light emitted by the first guided-light source. In the display device, the light guide body includes: a first light guide leg which includes a first light entrance surface facing the first guided-light source, and guides the first light emitted by the first guided-light source and entering the first light guide leg through the first light entrance surface; and a light exit portion which has a plate shape, is connected at an angle to the first light guide leg, and includes a first reflection design portion which reflects, in a first direction, a portion of the first light guided by the first light guide leg and a second reflection design portion which reflects, in the first direction, another portion of the first light guided by the first light guide leg. The light exit portion includes a first connecting portion connected to the first light guide leg. The first reflection design portion is disposed in a first region of the light exit portion when viewed in the first direction, the first region being located on a second direction side with respect to the first connecting portion, and the second reflection design portion is disposed in a second region of the light exit portion when viewed in the first direction, the second region being located on a third direction side with respect to the first connecting portion, the third direction side being different from the second direction side.

A display device according to another aspect of the present disclosure is a display device which includes: n guided-light sources which are disposed in an annular shape, and emit light to be guided; and a light guide body which guides the light emitted by the n guided-light sources. In the display device, the light guide body includes: n light guide legs which include n light entrance surfaces facing the n guided-light sources, and each of which guides light entering the light guide leg through a corresponding one of the n light entrance surfaces; and a light exit portion which has a plate shape, is connected at an angle to each of the n light guide legs, and includes (i) n reflection design portions that reflect, in a first direction, light guided by the n light guide legs and (ii) n connecting portions connected to the n light guide legs, the n reflection design portions and the n connecting portions being disposed alternately in an annular shape. Each of the n light guide legs includes (i) a first reflection surface which reflects a portion of light emitted by a corresponding one of the n guided-light sources, to one of two reflection design portions which are among the n reflection design portions and adjacent to each other across a corresponding one of the n connecting portions, and (ii) a second reflection surface which reflects another portion of the light to the other of the two reflection design portions, and each of the n reflection design portions of the light exit portion reflects, in the first direction, light reflected by the first reflection surface of a light guide leg which is among the n light guide legs and corresponds to one of two connecting portions that are adjacent to the reflection design portion among the n connecting portions, and light reflected by the second reflection surface of a light guide leg which is among the n light guide legs and corresponds to another of the two connecting portions.

An input device according to one aspect of the present disclosure includes: the above-described display device; and a switch which outputs a signal in response to pressing on (i) reflection design portions including the first reflection design portion and the second reflection design portion and disposed on the light guide body or (ii) a light-transmissive design portion disposed on a mask body.

The input device according to one aspect of the present disclosure and the display device according to one aspect of the present disclosure are capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
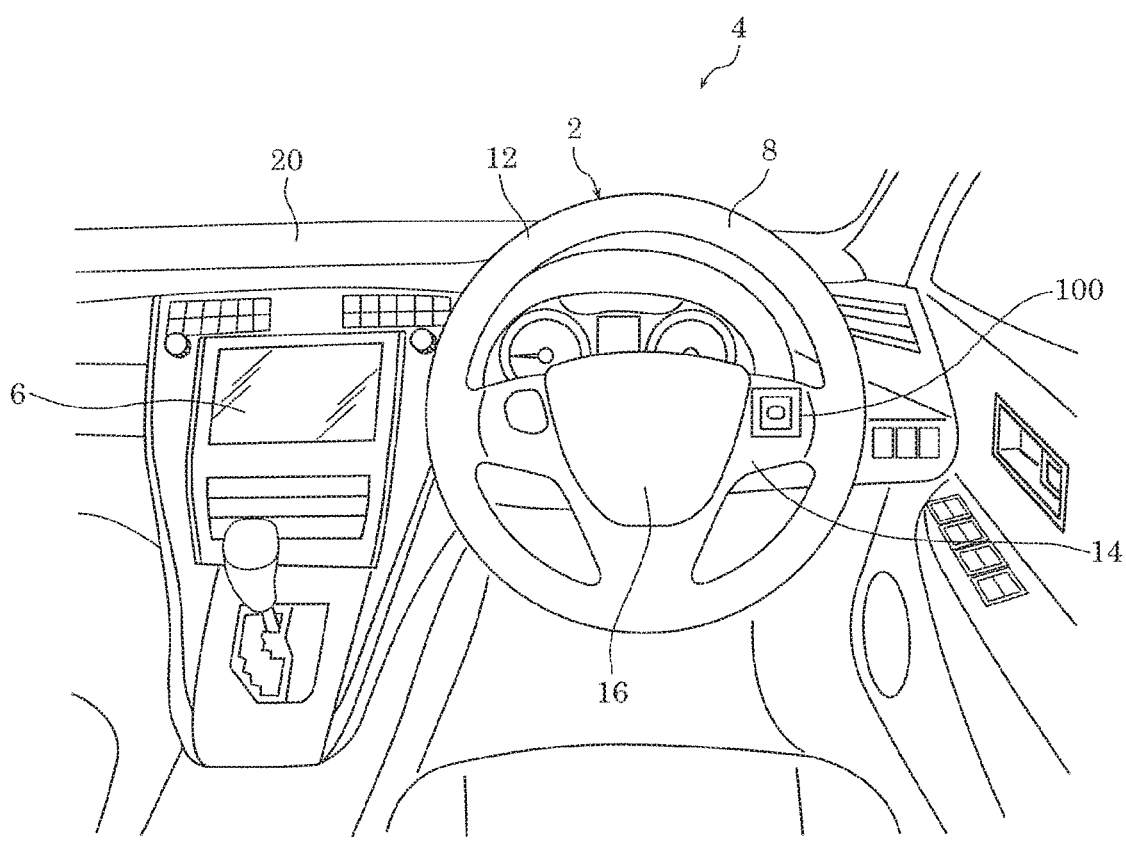
FIG. 1 is a diagram which illustrates an example of a vehicle interior of a vehicle in which a steering input device according to an embodiment is installed.

Underlying Knowledge Forming the Basis of the Present Disclosure

The inventors found that the following problem occur with the switch described in the "Description of the Related Art" section.

With the technique disclosed by Japanese Unexamined Patent Application Publication No. 2012-113001, there is a problem that, when a plurality of predetermined designs are to be displayed in a display device which causes a light guide body to guide light emitted from a light source to display a predetermined design, it is difficult to effectively display the plurality of designs.

In order to solve such a problem, a display device according to one aspect of the present disclosure is a display device which includes: a guided-light source which includes a first guided-light source that emits first light to be guided; and a light guide body which guides the first light emitted by the first guided-light source. In the display device, the light guide body includes: a first light guide leg which includes a first light entrance surface facing the first guided-light source, and guides the first light emitted by the first guided-light source and entering the first light guide leg through the first light entrance surface; and a light exit portion which has a plate shape, is connected at an angle to the first light guide leg, and includes a first reflection design portion which reflects, in a first direction, a portion of the first light guided by the first light guide leg and a second reflection design portion which reflects, in the first direction, another portion of the first light guided by the first light guide leg. The light exit portion includes a first connecting portion connected to the first light guide leg. The first reflection design portion is disposed in a first region of the light exit portion when viewed in the first direction, the first region being located on a second direction side with respect to the first connecting portion, and the second reflection design portion is disposed in a second region of the light exit portion when viewed in the first direction, the second region being located on a third direction side with respect to the first connecting portion, the third direction side being different from the second direction side.

According to the above-described configuration, it is possible to guide light emitted by the first guided-light source, to each of the first reflection design portion and the second reflection design portion which are disposed at different positions on the light exit portion. More specifically, the first light guide leg divides the light emitted by the first guided-light source into two portions, and guides the two portions of the light respectively to the first reflection design portion and the second reflection design portion. Accordingly, it is possible to effectively display a plurality of reflection designs corresponding to a plurality of reflection design portions. It is thus possible to reduce the amount of consumption energy used for displaying the plurality of reflection designs corresponding to the plurality of reflection design portions. In addition, it is possible to effectively display a plurality of designs with a simple configuration.

In addition, the light exit portion may have an opening between the first region and the second region.

According to the above-described configuration, the light exit portion includes, on a portion of the first region, a reflection surface facing the opening, and includes, on a portion of the second region, a reflection surface facing the opening. Accordingly, it is possible to effectively guide light to the first region and light to the second region. In addition, since it is possible to guide light to the reflection design portions from various angles, display unevenness can be reduced.

In addition, the first light guide leg may include: a first portion which includes a first reflection surface crossing a second direction when viewed in the first direction, and guides the portion of the first light entering the first light guide leg through the first light entrance surface to the first region of the light exit portion, by causing the first reflection surface to reflect the portion of the first light; and a second portion which includes a second reflection surface crossing a third direction when viewed in the first direction, and guides the other portion of the first light entering the first light guide leg through the first light entrance surface to the second region of the light exit portion, by causing the second reflection surface to reflect the other portion of the first light.

According to the above-described configuration, the first light guide leg divides the light emitted by the first guided-light source into two portions for the first portion and the second portion, and guides the two portions of the light respectively to the first reflection design portion and the second reflection design portion. Accordingly, it is possible to effectively display a plurality of reflection designs corresponding to a plurality of reflection design portions. It is thus possible to reduce the amount of consumption energy used for displaying a plurality of reflection designs.

In addition, the first reflection surface may be disposed across the second reflection surface from the second reflection design portion in the third direction, and the second reflection surface may be disposed across the first reflection surface from the first reflection design portion in the second direction.

According to the above-described configuration, it is possible to provide a light path for guiding light to the first reflection design portion and a light path for guiding light to the second reflection design portion as light paths independent of each other. Accordingly, it is possible to easily form light paths having shapes suitable for efficiently guiding light in the respective light paths. It is thus possible to effectively display a design corresponding to the first reflection design portion and a design corresponding to the second reflection design portion.

In addition, the guided-light source may further include a second guided-light source that emits second light to be guided. The light guide body may further include a second light guide leg connected at an angle to the light exit portion, across the first region of the light exit portion from the first light guide leg. The second light guide leg may include a second light entrance surface facing the second guided-light source, and may guide the second light emitted by the second guided-light source and entering the second light guide leg through the second light entrance surface, to the first region of the light exit portion.

According to the above-described configuration, it is possible to guide light to a single reflection design portion from two directions. It is thus possible to reduce display unevenness in displaying a design corresponding to the reflection design portion.

In addition, a display device according to one aspect of the present disclosure is a display device which includes: n guided-light sources which are disposed in an annular shape, and emit light to be guided; and a light guide body which guides the light emitted by the n guided-light sources. In the display device, the light guide body includes: n light guide legs which include n light entrance surfaces facing the n guided-light sources, and each of which guides light entering the light guide leg through a corresponding one of the n light entrance surfaces; and a light exit portion which has a plate shape, is connected at an angle to each of the n light guide legs, and includes (i) n reflection design portions that reflect, in a first direction, light guided by the n light guide legs and (ii) n connecting portions connected to the n light guide legs, the n reflection design portions and the n connecting portions being disposed alternately in an annular shape. Each of the n light guide legs includes (i) a first reflection surface which reflects a portion of light emitted by a corresponding one of the n guided-light sources, to one of two reflection design portions which are among the n reflection design portions and adjacent to each other across a corresponding one of the n connecting portions, and (ii) a second reflection surface which reflects another portion of the light to the other of the two reflection design portions, and each of the n reflection design portions of the light exit portion reflects, in the first direction, light reflected by the first reflection surface of a light guide leg which is among the n light guide legs and corresponds to one of two connecting portions that are adjacent to the reflection design portion among the n connecting portions, and light reflected by the second reflection surface of a light guide leg which is among the n light guide legs and corresponds to another of the two connecting portions.

According to the above-described configuration, it is possible to guide light to each of the plurality of reflection design portions from two directions. It is thus possible to arrange the number of the light sources to be the same as the number of the reflection design portions. Accordingly, it is possible to reduce display unevenness in displaying designs corresponding to the reflection design portions as well as consumption energy.

In addition, the light exit portion may have an opening located inside the annular shape in which the n reflection design portions are disposed.

According to the above-described configuration, it is possible to form, on the light exit portion, a reflection surface facing the opening, which reflects light to each of the n reflection design portions. Accordingly, it is possible to effectively guide light to each of the n reflection design portions. In addition, since it is possible to guide light to each of the n reflection design portions from various angles, display unevenness can be reduced.

In addition, the display device may further include: a mask body which faces the light exit portion, and includes (i) a light-transmissive design portion that transmits light and (ii) a light-blocking portion that is a remaining portion of the mask body and blocks light; a direct-light source which emits light toward the mask body in the first direction; and a control circuit which selectively causes the guided-light source and the direct-light source to emit light.

According to the above-described configuration, it is possible to easily display designs or a design by selectively switching between designs corresponding to the reflection design portions and a design which corresponds to the light-transmissive design portion and is different from the deigns corresponding to the reflection design portions.

In addition, the light-transmissive design portion disposed on the mask body may overlap with any one of reflection design portions including the first reflection design portion and the second reflection design portion and disposed on the light exit portion.

According to the above-described configuration, it is possible to implement a configuration for displaying different designs with a compact configuration.

In addition, an input device according to one aspect of the present disclosure includes: the above-described display device; and a switch which outputs a signal in response to pressing on (i) reflection design portions including the first reflection design portion and the second reflection design portion and disposed on the light guide body or (ii) a light-transmissive design portion disposed on a mask body.

According to the above-described configuration, it is possible to implement an input device for receiving input indicated by a design or designs.

In addition, (i) designs corresponding to the reflection design portions or (ii) a design corresponding to the light-transmissive design portion may be selectively displayed, and the switch may output a different signal according to whether the designs corresponding to the reflection design portions are displayed or the design corresponding to the light-transmissive design portion is displayed.

According to the above-described configuration, when a design or designs are selectively displayed, it is possible to output a signal corresponding to the displayed design or designs. In other words, since it is possible to switch between functions of a single switch, a compact configuration can be implemented.

In addition, the input device may further include: a control circuit which causes (i) designs corresponding to the reflection design portions or (ii) a design corresponding to the light-transmissive design portion to be selectively displayed. In the input device, the control circuit may receive the signal output by the switch in response to the pressing, as input which differs according to whether the designs corresponding to the reflection design portions are displayed or the design corresponding to the light-transmissive design portion is displayed.

According to the above-described configuration, when a design or designs are selectively displayed, it is possible to output a signal corresponding to the displayed design or designs. In other words, since it is possible to switch between functions of a single switch, a compact configuration can be implemented.

Embodiment (1-1. Configuration of Steering Input Device)

Figure 2:
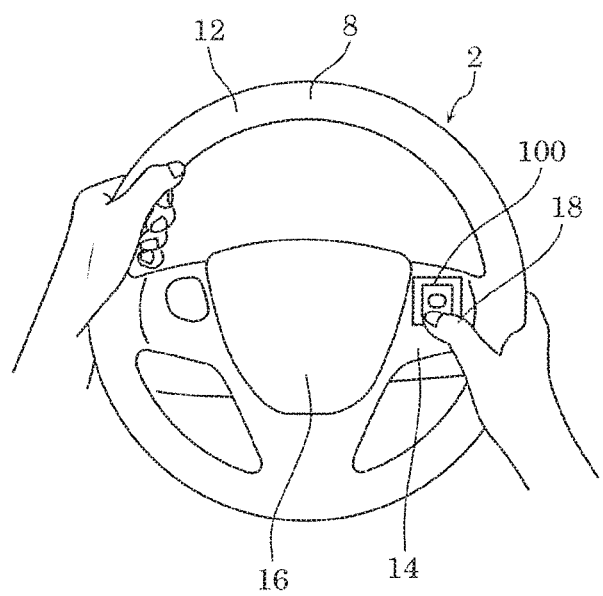
FIG. 2 is a diagram which illustrates a use example of the steering input device according to the embodiment.

First, a configuration of steering input device 2 according to an embodiment will be described with reference to FIG. 1 and FIG. 2. FIG. 1 is a diagram which illustrates an example of a vehicle interior of a vehicle in which steering input device 2 according to the embodiment is installed. FIG. 2 is a diagram which illustrates a use example of steering input device 2 according to the embodiment.

In the vehicle interior of automobile 4 (an example of the vehicle) illustrated in FIG. 1, steering input device 2 and on-vehicle device 6 are installed. Steering input device 2 according to the embodiment includes steering wheel 8 and input device 100.

Steering wheel 8 is for steering automobile 4. Steering wheel 8 includes rim 12 having a ring shape, spoke 14 having a substantially T-shape and formed integrally with rim 12 on an inner circumference surface of rim 12, and horn switch cover 16 which covers a horn switch (not illustrated) disposed at a center portion of spoke 14.

Input device 100 is for operating on-vehicle device 6, and is disposed on spoke 14 of steering wheel 8, for example. As illustrated in FIG. 2, a driver who is a user of input device 100 performs an input operation on input device 100 with finger 18 (one example of an operation object) of right hand gripping rim 12, thereby operating on-vehicle device 6. A configuration of input device 100 will be described later in detail.

On-vehicle device 6 is, for example, an audio device for reproducing an optical disc such as a compact disc, etc. On-vehicle device 6 is placed in dashboard 20, for example. A configuration of on-vehicle device 6 will be described later in detail.

(1-2. Configuration of Input Device)

Figure 3:
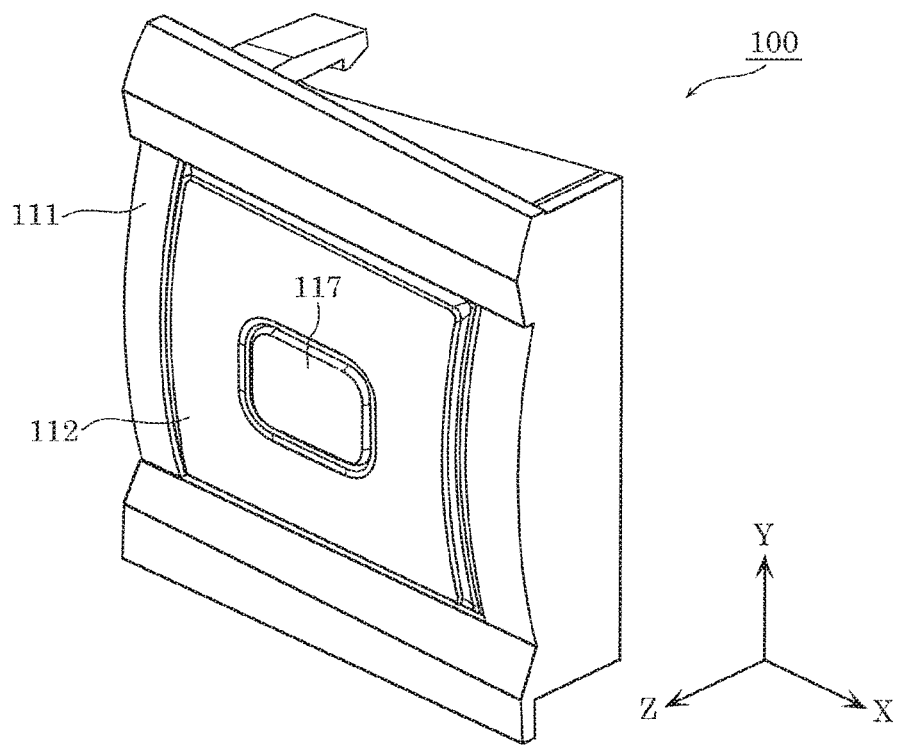
FIG. 3 is an external perspective view of an input device according to the embodiment.
Figure 4:
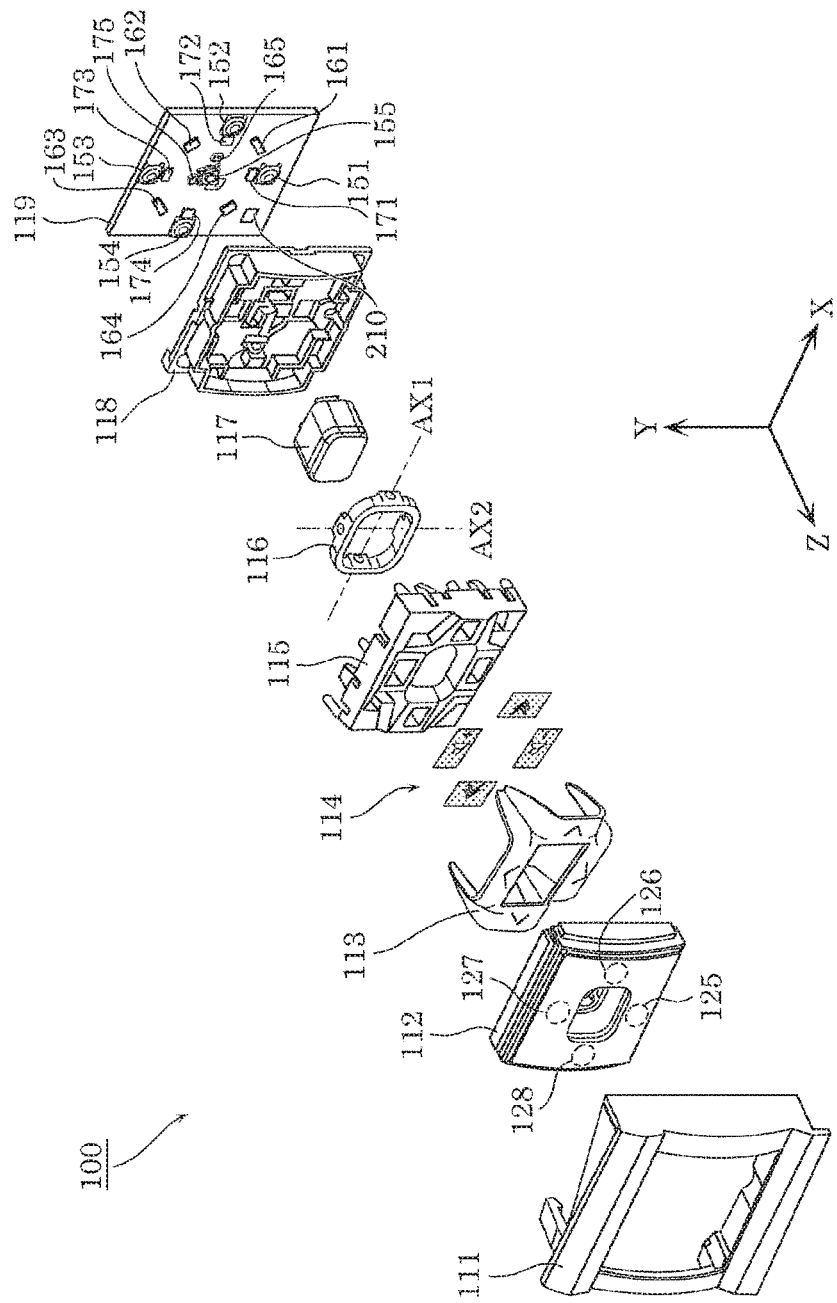
FIG. 4 is an exploded perspective view of the input device according to the embodiment.
Figure 5:
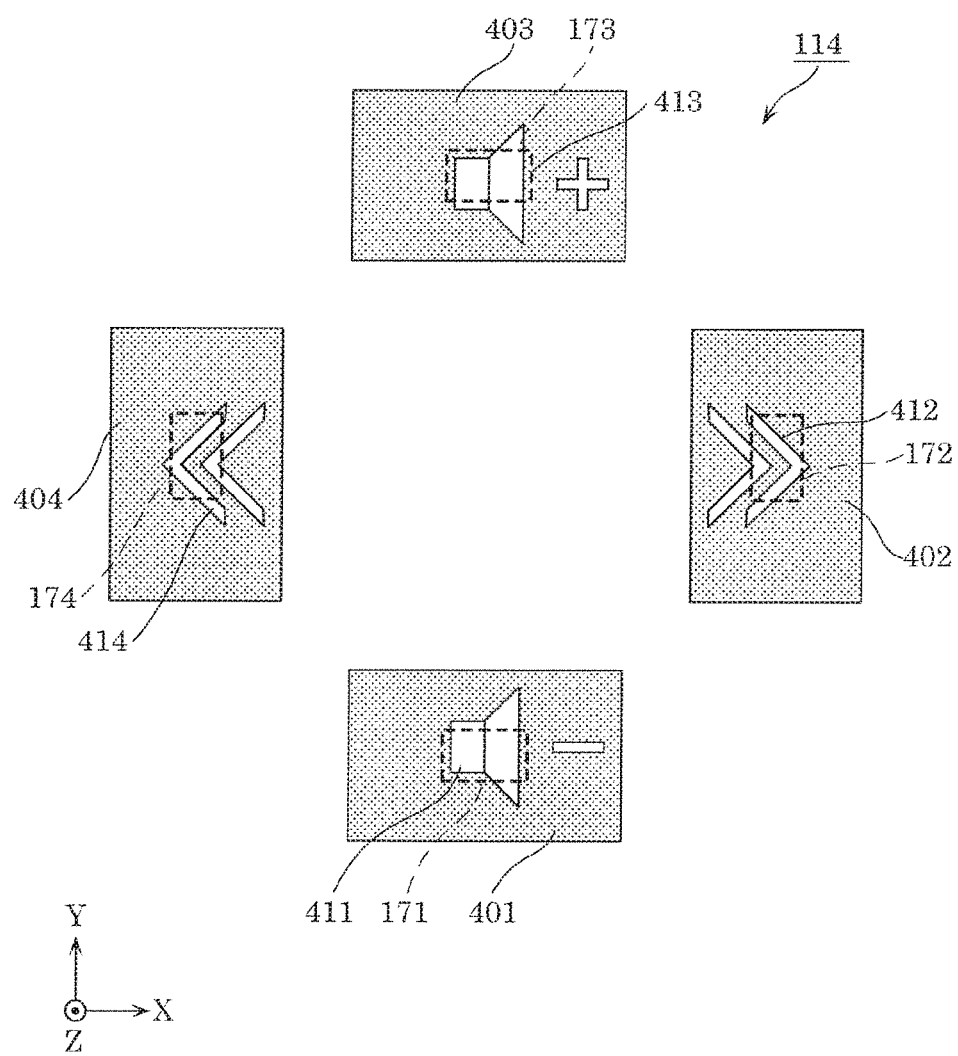
FIG. 5 is a plan view of a mask body according to the embodiment.

The following describes a configuration of input device 100 according to the embodiment, with reference to FIG. 3 to FIG. 5. FIG. 3 illustrates an external perspective view of input device 100 according to the embodiment. FIG. 4 illustrates an exploded perspective view of input device 100 according to the embodiment. FIG. 5 is a plan view of mask body 114 according to the embodiment. In the diagrams, an X-axis direction, a Y-axis direction, and a Z-axis direction are directions which are mutually different and substantially orthogonal to one another.

As illustrated in FIG. 3 and FIG. 4, input device 100 according to the embodiment includes: housing 111; first operation unit 112; light guide body 113; mask body 114; first supporter 115; shaft body 116; second operation unit 117; second supporter 118; and board 119.

Housing 111 is a component which is disposed on a front-surface side (a Z-axis positive side) of input device 100.

First operation unit 112 is a component which is operated by the driver to selectively press any one of four switches 151 to 154 mounted on board 119 disposed on rear-surface side (a Z-axis negative side). First operation unit 112 is swingably supported biaxially by first supporter 115, shaft body 116, and second supporter 118. More specifically, first operation unit 112 is swingably supported about an axis parallel to the X-axis direction and an axis parallel to the Y-axis direction.

For example, first operation unit 112 includes portion 125 located on a Y-axis negative side, portion 126 located on an X-axis positive side, portion 127 located on a Y-axis positive side, and portion 128 located on an X-axis negative side. When portion 125 is pressed by the driver, portion 125 swings about first axis AX1 parallel to the X-axis direction of shaft body 116, and presses switch 151 which is disposed on board 119 at a position corresponding to portion 125. When portion 126 of first operation unit 112 is pressed by the driver, portion 126 swings about second axis AX2 parallel to the Y-axis direction of shaft body 116, and presses switch 152 which is disposed on board 119 at a position corresponding to portion 126. In the same manner as above, when portion 127 of first operation unit 112 is pressed, portion 127 presses switch 153 located at a position corresponding to portion 127, and when portion 128 of first operation unit 112 is pressed, portion 128 presses switch 154 located at a position corresponding to portion 128.

Light guide body 113 guides light emitted by light sources 161 to 164 mounted on board 119, in a direction (in the positive direction of the Z-axis which corresponds to a first direction) opposite to a direction in which switches 151 to 154 are pressed (the negative direction of the Z-axis), such that the light is emitted from positions corresponding to switches 151 to 154. Specifically, light guide body 113 is disposed forward of board 119 (on the Z-axis positive side). Light guide body 113 is formed using a transparent material, such as an acrylic resin, a polycarbonate resin, etc. A specific configuration of light guide body 113 will be described later.

Light guide body 113 includes four reflection design portions 141 to 144 (see description below) formed at four positions respectively corresponding to the four portions 125 to 128 of first operation unit 112. Reflection design portions 141 to 144 of light guide body 113 reflect light emitted by light sources 161 to 164, in the positive direction of the Z-axis. In other words, when light sources 161 to 164 emit light, four designs corresponding to reflection design portions 141 to 144 are respectively displayed on the four portions 125 to 128 of first operation unit 112 of input device 100.

As illustrated in FIG. 5, mask body 114 comprises a plurality of mask parts 401 to 404 each having a substantially rectangular plate shape. The plurality of mask parts 401 to 404 respectively transmit, in the positive direction of the Z-axis, light emitted by light sources 171 to 174 mounted on board 119, through light-transmissive design portions 411 to 414 indicated by the blank portions in the diagram, and block the light by light-blocking portions that are remaining portions of the plurality of mask parts 401 to 404 and indicated by the dotted portions in the diagram. In this manner, when light sources 171 to 174 emit light, four designs corresponding to light-transmissive design portions 411 to 414 are respectively displayed on the four portions 125 to 128 of first operation unit 112 of input device 100.

First supporter 115 is a component which supports first operation unit 112 and light guide body 113. In addition, first supporter 115 swingably supports shaft body 116 about second axis AX2.

Second supporter 118 is a component which supports second operation unit 117. In addition, second supporter 118 swingably supports shaft body 116 about first axis AX1.

First supporter 115 and second supporter 118 are arranged to mutually avoid interference. Accordingly, first supporter 115 is capable of biaxially swinging since shaft body 116 is present with respect to second supporter 118. Thus, first operation unit 112 is capable of biaxially swinging with respect to second supporter 118.

Second operation unit 117 is supported slidably along the Z-axis relative to second supporter 118, and presses switch 155 disposed at the center of board 119 when pressed in the negative direction of the Z-axis. With the above-described configuration, it is possible, for example, to implement a function of performing menu selection by carrying out four-way operation by first operation unit 112, and determining an item selected by second operation unit 117.

First supporter 115, shaft body 116, second operation unit 117, and second supporter 118 are formed using, for example, an opaque resin.

Board 119 is a wiring board which includes a plurality of switches 151 to 155, a plurality of light sources 161 to 165 as guided-light sources which emit light to light guide body 113, and a plurality of light sources 171 to 175 as direct-light sources. The plurality of switches 151 to 155, and the plurality of light sources 161 to 165 and 171 to 175 are mounted on a main surface of board 119. The main surface of board 119 faces a front surface side (the Z-axis positive side). Accordingly, it is possible to dispose the plurality of switches 151 to 155, and the plurality of light sources 161 to 165 and 171 to 175 with a simple configuration. It should be noted that board 119 may further include control circuit 210.

Each of the plurality of switches 151 to 155 switches between on and off when pressed. More specifically, each of the plurality of switches 151 to 155 is a switch which switches between on and off of a preset function, by being pressed.

The plurality of light sources 161 to 164 (n light sources, and n is four in the present embodiment) are disposed to respectively correspond to n (n is four in the present embodiment) light guide legs 310, 320, 330, and 340 which are included in light guide body 113 and will be described later. The four light sources 161 to 164 are disposed in an annular shape. Likewise, light source 165 is disposed to correspond to a non-illustrated light guide body which guides light to second operation unit 117, and light source 175 is disposed to correspond to a non-illustrated mask body disposed facing second operation unit 117. Each of the plurality of light sources 161 to 165 and 171 to 175 includes, for example a light emitting diode (LED).

The plurality of switches 151 to 155 are disposed at mutually different positions on the main surface (i.e., the front surface) of board 119. Likewise, the plurality of light sources 161 to 165 and 171 to 175 are disposed at mutually different positions on the main surface of board 119.

It should be noted that first operation unit 112 is formed using a light-transmissive material, such as resin. First operation unit 112 may be colored to have a smoke color. With this configuration, when light sources 161 to 164 or light sources 171 to 174 which are mounted on board 119 emit light, it is possible cause the light emitted from reflection design portions 141 to 144 formed on light guide body 113 or the light transmitted through light-transmissive design portions 411 to 414 to emit in the positive direction of the Z-axis, and when light sources 161 to 164 or light sources 171 to 174 do not emit light, it is possible to reduce the possibility that the components inside input device 100 are visually recognized by the driver.

(1-3. Configuration of Light Guide Body)

Figure 6:
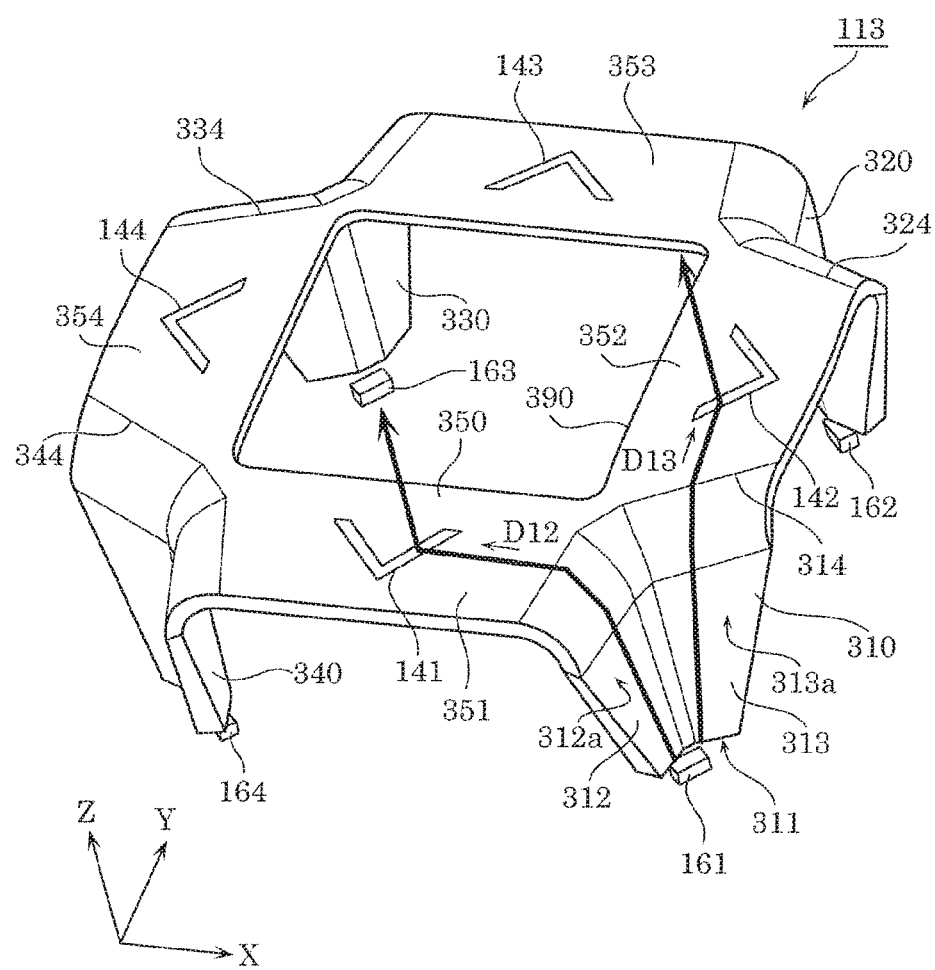
FIG. 6 is an external perspective view of a light guide body.
Figure 7:
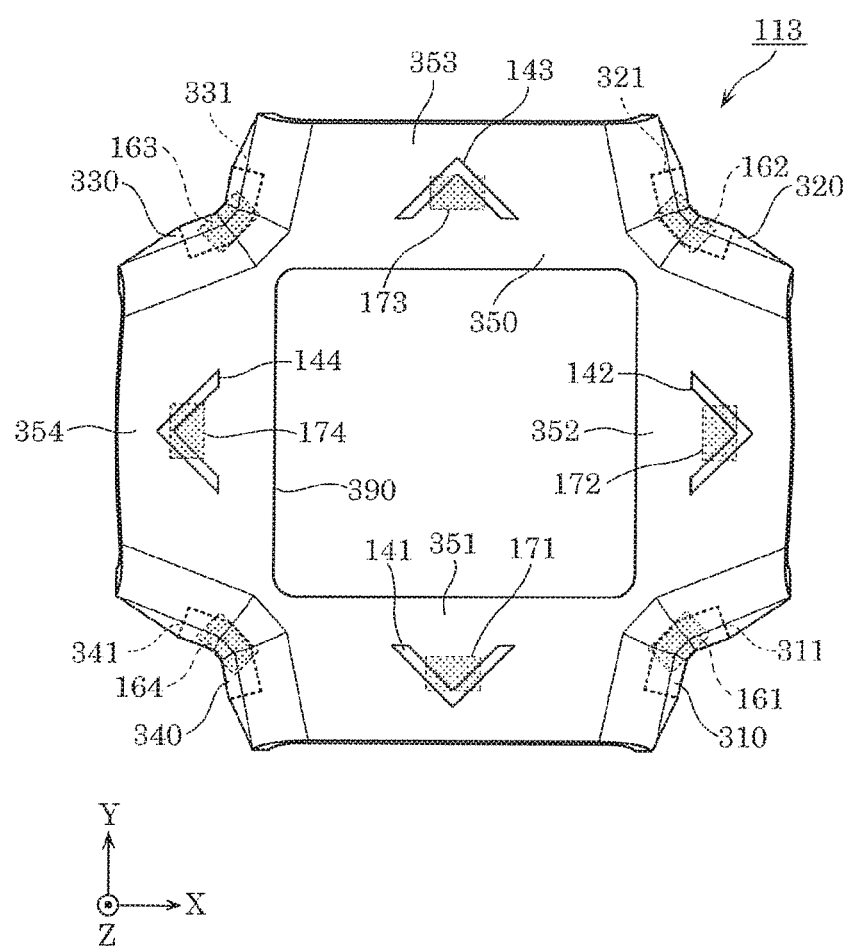
FIG. 7 illustrates a front view of the light guide body, viewed from a Z-axis positive side.
Figure 8:
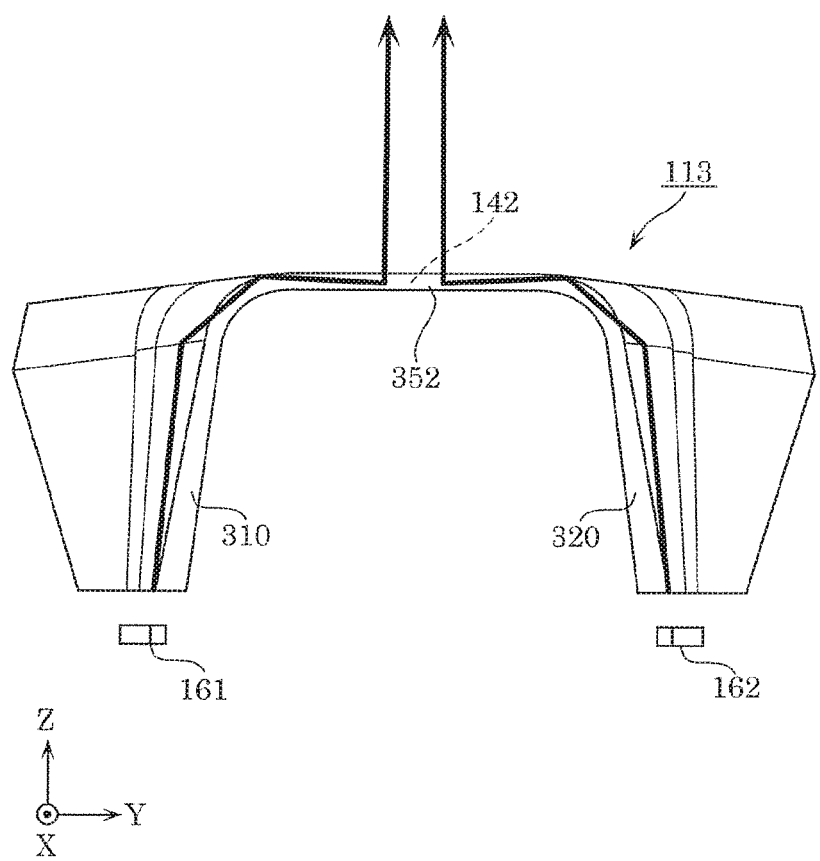
FIG. 8 illustrates a side view of the light guide body, viewed from an X-axis positive side.
Figure 9:
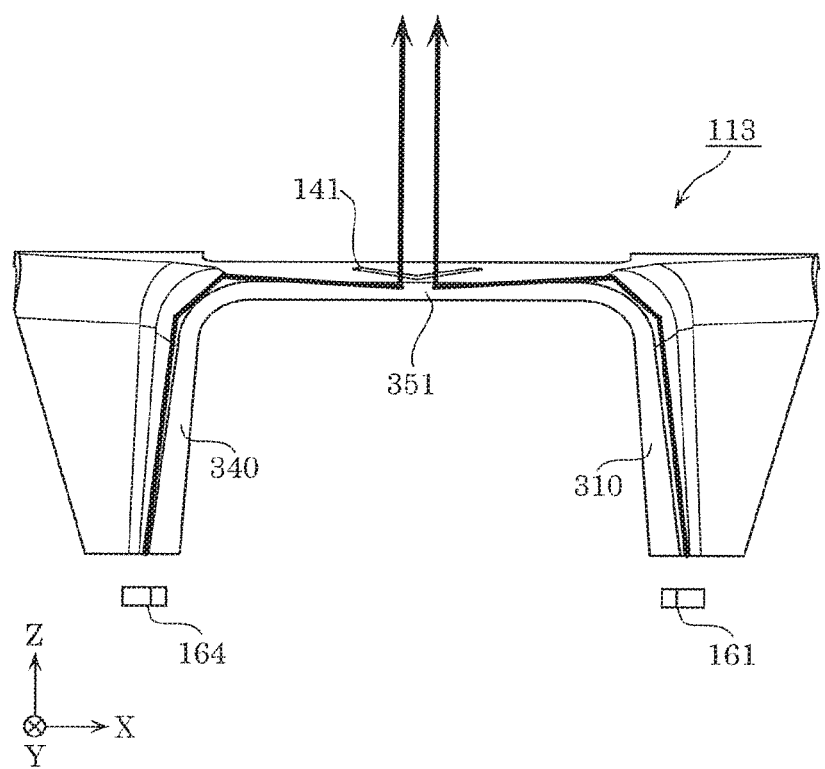
FIG. 9 illustrates a side view of the light guide body, viewed from a Y-axis positive side.

The following describes a configuration of light guide body 113 according to the embodiment, with reference to FIG. 6 to FIG. 9. FIG. 6 illustrates an external perspective view of light guide body 113. FIG. 7 illustrates a front view of light guide body 113, viewed from the Z-axis positive side. FIG. 8 illustrates a side view of light guide body 113, viewed from the X-axis positive side. FIG. 9 illustrates a side view of light guide body 113, viewed from the Y-axis positive side.

Light guide body 113 includes n (n is four in the present embodiment) light guide legs 310, 320, 330, and 340, and light exit portion 350.

Light guide leg 310 includes light entrance surface 311 disposed to face light source 161, and guides light emitted by light source 161 and entering light guided leg 310 from light entrance surface 311. In the same manner as above, light guide leg 320 includes light entrance surface 321 disposed to face light source 162, and guides light emitted by light source 162 and entering light guided leg 320 from light entrance surface 321. In the same manner as above, light guide leg 330 includes light entrance surface 331 disposed to face light source 163 and guides light emitted by light source 163 and entering light guided leg 330 from light entrance surface 331. In the same manner as above, light guide leg 340 includes light entrance surface 341 disposed to face light source 164 and guides light emitted by light source 164 and entering light guided leg 340 from light entrance surface 341. In other words, the four light guide legs 310, 320, 330, and 340 include four light entrance surfaces 311, 321, 331, and 341, respectively, which are disposed to face the four light sources 161 to 164. Each of the four light guide legs 310, 320, 330, and 340 guides light entering through a corresponding one of the four light entrance surfaces.

Light exit portion 350 is a component having a plate shape and connected at an angle to each of the four light guide legs 310, 320, 330, and 340. Light exit portion 350 includes the four reflection design portions 141 to 144 and four connection portions to which the four light guide legs 310, 320, 330, and 340 are connected. The four reflection design portions 141 to 144 and the four connection portions are disposed alternately in an annular shape. Stated differently, on light exit portion 350, when viewed in the Z-axis direction, the four light guide legs 310, 320, 330, and 340 and the four reflection design portions 141 to 144 are disposed alternately with each other and at different angles to the center of light exit portion 350. It should be noted that the four reflection design portions 141 to 144 are disposed at positions overlapping with the four light-transmissive design portions 411 to 414 formed in mask body 114.

In addition, light exit portion 350 has opening 390 at the center. Opening 390 is located inside the annular shape in which the four reflection design portions 141 to 144 of light exit portion 350 are arranged. More specifically, opening 390 is located in a region between two reflection design portions among the four reflection design portions 141 to 144. The two reflection design portions are adjacent to each other along the circumference of the annular shape.

In addition, when viewed in the Z-axis direction, light exit portion 350 includes reflection design portion 141 disposed in region 351 located on the X-axis negative side relative to connecting portion 314 to which light guide leg 310 is connected. Furthermore, when viewed in the Z-axis direction, reflection design portion 142 is disposed in region 352 located on the Y-axis positive side relative to connecting portion 314.

In addition, when viewed in the Z-axis direction, light exit portion 350 includes reflection design portion 142 disposed in region 352 located on the Y-axis negative side relative to connecting portion 324 to which light guide leg 320 is connected. Furthermore, when viewed in the Z-axis direction, reflection design portion 143 is disposed in region 353 located on the X-axis negative side relative to connecting portion 324.

In addition, when viewed in the Z-axis direction, light exit portion 350 includes reflection design portion 143 disposed in region 353 located on the X-axis positive side relative to connecting portion 334 to which light guide leg 330 is connected. Furthermore, when viewed in the Z-axis direction, reflection design portion 144 is disposed in region 354 located on the Y-axis negative side relative to connecting portion 334.

In addition, when viewed in the Z-axis direction, light exit portion 350 includes reflection design portion 144 disposed in region 354 located on the Y-axis positive side relative to connecting portion 344 to which light guide leg 340 is connected. Furthermore, when viewed in the Z-axis direction, reflection design portion 141 is disposed in region 351 located on the X-axis positive side relative to connecting portion 344.

Next, the configurations of light guide legs 310, 320, 330, and 340 will be described.

Light guide leg 310 includes first portion 312 having first reflection surface 312*a* and second portion 313 having second reflection surface 313*a*. First portion 312 includes first reflection surface 312*a* which crosses direction D12 (i.e., the negative direction of the X-axis which corresponds to a second direction) when viewed in the Z-axis direction. First portion 312 causes a portion of light emitted by light source 161 and entering light guide leg 310 from light entrance surface 311 to be reflected by first reflection surface 312*a*, thereby guiding the portion of light to region 351 of light exit portion 350. First portion 312 has a substantially plate shape.

Second portion 313 includes second reflection surface 313a which crosses direction D13 (i.e., the positive direction of the Y-axis which corresponds to a third direction) when viewed in the Z-axis direction. Second portion 313 causes another portion of the light emitted by light source 161 and entering light guide leg 310 from light entrance surface 311 to be reflected by second reflection surface 313a, thereby guiding the other portion of light to region 352 of light exit portion 350. Second portion 313 has a substantially plate shape.

In addition, first reflection surface 312a is disposed across second reflection surface 313a from reflection design portion 142 in the Y-axis direction. In other words, first reflection surface 312a is located on the Y-axis negative side relative to reflection design portion 142. In addition, second reflection surface 313a is disposed across first reflection surface 312a from reflection design portion 141 in the X-axis direction. In other words, second reflection surface 313a is located on the X-axis positive side relative to reflection design portion 141.

In view of the above, first reflection surface 312a and second reflection surface 313a are disposed at different angles when viewed in the Z-axis direction, and cross each other at an imaginary line along the direction in which light guide leg 310 extends. Accordingly, since first portion 312 and second portion 313 which have substantially plate shapes cross each other, light guide leg 310 has a substantially V-shape at a cross section parallel to the XY plane. When viewed in the Z-axis direction, light guide leg 310 is formed such that the vertex of the substantially V-shape protrudes toward the center of light exit portion 350.

The configuration of each of the other light guide legs 320, 330, and 340 is a similar to the configuration of light guide leg 310, and only differs in that the angle at which each of the other light guide legs 320, 330, and 340 is connected to light exit portion 350 varies by approximately 90 degrees. Accordingly, as with light guide leg 310, the other light guide legs 320, 330, and 340 each have a first reflection surface which reflects a portion of light emitted by a corresponding one of light sources 162 to 164, to one of two reflection design portions adjacent to each other across a corresponding one of connecting portions 324, 334, and 344, and a second reflection surface which reflects another portion of the light to the other reflection design portion. It should be noted that descriptions of specific configurations of the other light guide legs 320, 330, and 340 will be omitted.

As described above, the four light guide legs 310, 320, 330, and 340 are disposed alternately with the four reflection design portions 141 to 144, respectively. Each of the four reflection design portions 141 to 144 reflects, toward the Z-axis positive side, light reflected by one of the two adjacent light guide legs among the four light guide legs 310, 320, 330, and 340 arranged along the circumference of the annular shape and light reflected by the other of the two adjacent light guide legs.

In other words, as illustrated in FIG. 9, reflection design portion 141 reflects, toward the Z-axis positive side, the light reflected by light guide leg 310 toward the X-axis negative side and the light reflected by light guide leg 340 toward the X-axis positive side. As illustrated in FIG. 8, reflection design portion 142 reflects, toward the Z-axis positive side, the light reflected by light guide leg 310 toward the Y-axis positive side and the light reflected by light guide leg 320 toward the Y-axis negative side. Reflection design portion 143 reflects, toward the Z-axis positive side, the light reflected by light guide leg 320 toward the X-axis negative side and the light reflected by light guide leg 330 toward the X-axis positive side. Reflection design portion 144 reflects, toward the Z-axis positive side (i.e., in the positive direction of the Z-axis which corresponds to a first direction), the light reflected by light guide leg 330 toward the Y-axis negative side and the light reflected by light guide leg 340 toward the Y-axis positive side.

It should be noted that each of the four reflection design portions 141 to 144 includes a plurality of recesses which are formed in the Z-axis negative direction in light exit portion 350, and are not illustrated. More specifically, each of the four reflection design portions 141 to 144 includes a group of the plurality of recesses arranged in a shape of a corresponding reflection design. The plurality of recesses each have a substantially conical shape or a substantially pyramid shape having a vertex on the Z-axis positive side, and a bottom surface opened in a space on the Z-axis negative side.

(1-4. Control Circuit)

Figure 10:
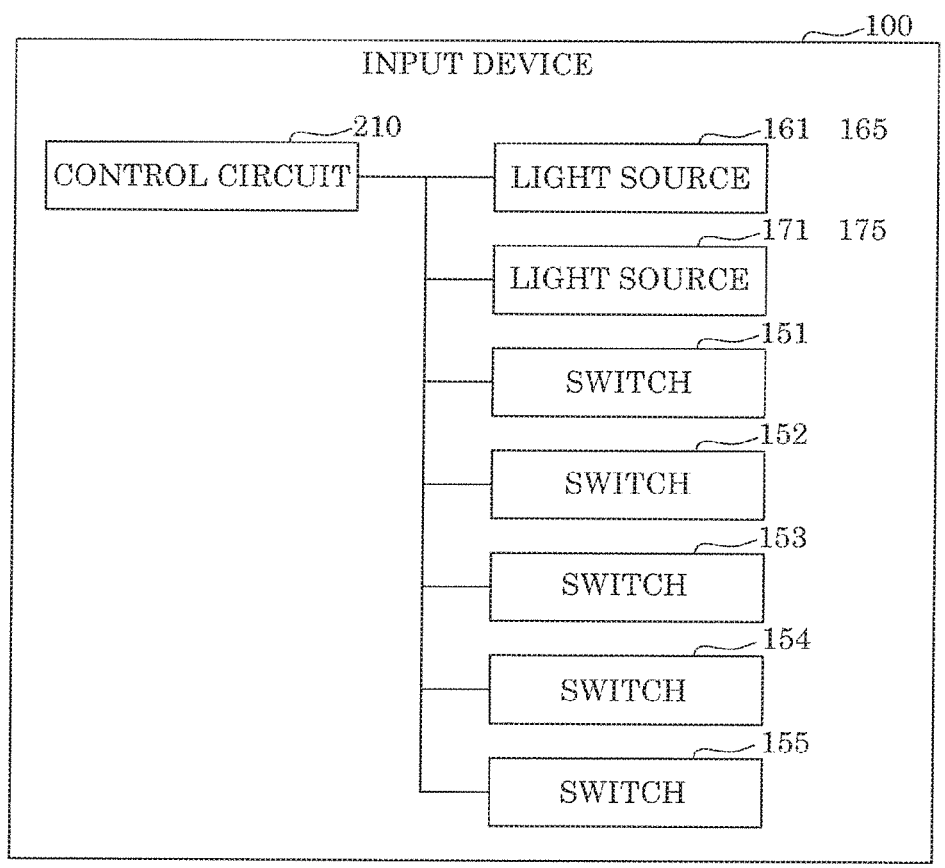
FIG. 10 is a block diagram which illustrates an example of a circuit configuration of the input device.

FIG. 10 is a block diagram which illustrates an example of a circuit configuration of input device 100.

Control circuit 210 switches, according to two operation modes, input by four switches 151 to 154, and receives the input. For example, control circuit 210 causes input device 100 to operate in two operation modes, namely, a menu selecting mode as a first operation mode and a music player mode as a second operation mode. Control circuit 210 switches an input when the four switches 151 to 154 are pressed, according to the operation mode that is switched to by a predetermined switching means (for example, a selection switch which is not illustrated). Various switching means such as audio recognition, gesture recognition, etc., may be included in the examples of the predetermined switching means in addition to on and off of the selection switch.

In addition, control circuit 210 associates, according to the operation mode, the input indicated by the signals output by the four switches 151 to 154 assigned, with designs displayed by emission of light sources 161 to 165 and 171 to 175. For example, in the first operation mode, switches 151 to 154 serve as arrow keys for shifting the item that is selected, in order to select a menu. In addition, in the second operation mode, switches 151 to 154 serve as keys for forwarding or rewinding the number, turning up or down the volume, starting or stopping, etc. of a music player.

In other words, control circuit 210 selectively causes light sources 161 to 165 or light sources 171 to 175 to emit light, according to the operation mode. In this manner, control circuit 210 controls light sources 161 to 165 and light sources 171 to 175 such that (i) designs corresponding to reflection design portions 141 to 144 are displayed by causing light sources 161 to 165 to emit light in the first operation mode, and (ii) designs corresponding to light-transmissive design portions 411 to 414 are displayed by causing light sources 171 to 175 to emit light in the second operation mode.

More specifically, control circuit 210 causes light sources 161 to 165 to emit light and light sources 171 to 175 to be turned off in the first operation mode, and causes light sources 171 to 175 to emit light and light sources 161 to 165 to be turned off in the second operation mode. In other words, control circuit 210 selectively switches between (i) a first state in which light sources 161 to 165 emit light and light sources 171 to 175 are off and (ii) a second state in which light sources 171 to 175 emit light and light sources 161 to 165 are off, according to whether the operation mode is the first operation mode or the second operation mode. As described above, control circuit 210 receives a signal output by each of switches 151 to 154 in response to pressing, as input which differs according to whether the designs displayed are the designs corresponding to reflection design portions 141 to 144 or the designs corresponding to light-transmissive design portions 411 to 414.

It should be noted that, although control circuit 210 receives a signal output by each of switches 151 to 154 as input which differs according to whether the designs displayed are the designs corresponding to reflection design portions 141 to 144 or the designs corresponding to light-transmissive design portions 411 to 414 in the above-described example, the signal itself that is output by each of switches 151 to 154 may be caused to differ instead. More specifically, each of switches 151 to 154 may output a signal which differs according to whether the designs displayed are designs corresponding to reflection design portions 141 to 144 or the designs corresponding to light-transmissive design portions 411 to 414. In this case, each of switches 151 to 154 may, for example, output a different signal by outputting a signal at a first voltage in the first operation mode and a signal at a second voltage that is different from the first voltage in the second operation mode.

[1-5. Advantageous Effects, Etc.]

With input device 100 according to the present embodiment, it is possible to guide, by light guide leg 310 for example, light emitted by light source 161, to each of reflection design portion 141 and reflection design portion 142 disposed at different positions on light exit portion 350. More specifically, light guide leg 310 divides the light emitted by light source 161 into two portions respectively for first portion 312 and second portion 313, and guides the two portions of the light respectively to reflection design portion 141 and reflection design portion 142. Accordingly, it is possible to effectively display two reflection designs corresponding to two reflection design portions 141 and 142. It is thus possible to reduce the amount of consumption energy used for displaying two reflection designs corresponding to reflection design portions 141 and 142.

In addition, with input device 100, light exit portion 350 has opening 390 between region 351 and region 352. According to the above-described configuration, light exit portion 350 includes, on a portion of region 351, a reflection surface facing opening 390, and includes, on a portion of region 352, a reflection surface facing opening 390. Accordingly, it is possible to effectively guide light from light entrance surface 311 to region 351, and light from light entrance surface 311 to region 352. In addition, since it is possible to guide light to reflection design portions 141 and 142 from various angles, display unevenness can be reduced.

In addition, first reflection surface 312a is located on the Y-axis negative side relative to reflection design portion 142. Second reflection surface 313a is located on the X-axis positive side relative to reflection design portion 141. According to the above-described configuration, it is possible to provide a light path for guiding light to reflection design portion 141 and a light path for guiding light to reflection design portion 142 as light paths independent of each other. Accordingly, it is possible to easily form light paths having shapes suitable for efficiently guiding light in the respective light paths. It is thus possible to effectively display a design corresponding to reflection design portion 141 and a design corresponding to reflection design portion 142.

In addition, light guide body 113 includes light guide leg 320 across reflection design portion 142 from light guide leg 310. According to the above-described configuration, it is possible to guide light to a single reflection design portion 142 from two directions. It is thus possible to reduce display unevenness in displaying a design corresponding to reflection design portion 142. In addition, light guide body 113 has a similar configuration for each of the other reflection design portions 141, 143, and 144, and thus it is also possible to reduce display unevenness in displaying a design corresponding to each of design portions 141, 143, and 144.

In addition, in the above-described configuration, light guide body 113 includes: four light guide legs 310, 320, 330, and 340 which are disposed to face four light sources 161 to 164 disposed in an annular shape; and light exit portion 350 including four reflection design portions 141 to 144. The four reflection design portions 141 to 144 and the four light guide legs 310, 320, 330, and 340 are disposed alternately in an annular shape. According to the above-described configuration, it is possible to guide light to each of the four reflection design portions 141 to 144 from two directions. It is thus possible to arrange the number of the light sources to be the same as the number of the reflection design portions. Accordingly, it is possible to reduce display unevenness in displaying designs corresponding to reflection design portions 141 to 144 as well as consumption energy.

In addition, light exit portion 350 has opening 390 located inside the annular shape in which the four reflection design portions 141 to 144 are disposed. According to the above-described configuration, it is possible to form, on light exit portion 350, a reflection surface facing opening 390, which reflects light to each of the four reflection design portions 141 to 144. Accordingly, it is possible to effectively guide light to each of the four reflection design portions 141 to 144. In addition, since it is possible to guide light to each of the four reflection design portions 141 to 144 from various angles, display unevenness can be reduced.

In addition, input device 100 includes mask body 114, light sources 171 to 174, and control circuit 210. Mask body 114 faces light exit portion 350, and includes (i) light-transmissive design portions 411 to 414 that transmit light and (ii) a light-blocking portion that is a remaining portion of mask body 114 and blocks light. Light sources 171 to 174 emit light toward mask body 114 from the Z-axis negative side. Control circuit 210 selectively causes light sources 161 to 164 or light sources 171 to 174 to emit light. According to the above-described configuration, input device 100 is capable of easily displaying designs by selectively switching between designs corresponding to reflection design portions 141 to 144 and designs corresponding to light-transmissive design portions 411 to 414.

In addition, in input device 100, reflection design portions 141 to 144 disposed on light exit portion 350 overlap with light-transmissive design portions 411 to 414 disposed on mask body 114. According to the above-described configuration, it is possible to implement a configuration for displaying different designs with a compact configuration.

In addition, input device 100 includes switches 151 to 154 which output signals in response to pressing on (i) reflection design portions 141 to 144 disposed on light guide body 113 or (ii) light-transmissive design portions 411 to 414 disposed on mask body 114. According to the above-described configuration, it is possible to implement input device 100 for receiving input indicated by designs corresponding to the respective design portions.

In addition, in input device 100, the plurality of switches 151 to 154 respectively correspond to (i) the plurality of reflection design portions 141 to 144 disposed on light guide body 113 or (ii) the plurality of light-transmissive design portions 411 to 414 disposed on mask body 114, and output different signals according to pressing on the corresponding reflection design portions 141 to 144 or light-transmissive design portions 411 to 414. According to the above-described configuration, when different designs are selectively displayed, input device 100 is capable of outputting signals corresponding to the displayed designs. In other words, since it is possible to switch between functions of a single switch, a compact configuration can be implemented.

(1-6. Variation)

(1-6-1. Variation 1)

Although the foregoing embodiment describes the case where input device 100 includes switches 151 to 155, the present disclosure may be implemented without switches 151 to 155, and may be implemented as a display device which selectively displays (i) designs corresponding to reflection design portions 141 to 144 or (ii) designs corresponding to light-transmissive design portions 411 to 414. In addition, the display device may be implemented without mask body 114 and light sources 171 to 174, and may be implemented as a device which displays reflection designs corresponding to reflection design portions 141 to 144.

(1-6-2. Variation 2)

Although the foregoing embodiment describes the case where input device 100 selectively displays (i) designs corresponding to reflection design portions 141 to 144 or (ii) designs corresponding to light-transmissive design portions 411 to 414, the present disclosure may be implemented without mask body 114 and light sources 171 to 174, and may be implemented as an input device which displays designs corresponding to reflection design portions 141 to 144, and receives input to corresponding switches 151 to 154.

(1-6-3. Variation 3)

Although the foregoing embodiment describes the case where light guide body 113 includes four light guide legs 310, 320, 330 and 340 and light exit portion 350 includes four reflection design portions 141 to 144 disposed thereon, the present disclosure is not limited to this configuration. The present disclosure may be implemented to have a configuration including a light guide body which includes only a single light guide leg 310 and a portion of light exit portion 350 on which two reflection design portions 141 and 142 are disposed, among the components included in light guide body 113. With this configuration, it is also possible to yield the advantageous effect that light emitted by a single light source can be divided into two portions to be guided to the two reflection design portions 141 and 142.

Alternatively, the present disclosure may be implemented to have a configuration including a light guide body which includes only two light guide legs 310 and 320 and a portion of light exit portion 350 on which two reflection design portions 141 and 142 are disposed, among the components included in light guide body 113. With this configuration, it is possible to guide light to reflection design portion 142 by the two light guide legs 310 and 320. Accordingly, display unevenness can be alleviated.

(1-6-4. Variation 4)

Although the foregoing embodiment describes the case where first reflection surface 312a and second reflection surface 313a of light guide leg 310 are surfaces crossing each other, first reflection surface 312a and second reflection surface 313a are not limited to this configuration, and may form a single surface without crossing each other. For example, first reflection surface 312a and second reflection surface 313a may be formed as a surface tilted at 45 degrees with respect to the X-axis direction and the Y-axis direction, when viewed in the Z-axis direction. In this case, in front view of the surface, a portion of the surface adjacent to a first design portion is the first reflection surface, and a portion of the surface adjacent to a second design portion is the second reflection surface.

(1-6-5. Variation 5)

Although the foregoing embodiment describes the case where light exit portion 350 of light guide body 113 has opening 390, light exit portion 350 may be configured without opening 390.

(1-6-6. Variation 6)

Although the foregoing embodiment describes the case where reflection design portions 141 to 144 disposed on light exit portion 350 of light guide body 113 overlap with light-transmissive design portions 411 to 414 disposed on mask body 114, reflection design portions 141 to 144 and light-transmissive design portions 411 to 414 may be disposed without overlapping with each other.

(1-6-7. Variation 7)

Although the foregoing embodiment describes the case where mask body 114 comprises a plurality of mask parts 401 to 404, mask body 114 is not limited to this, and may comprise an integrated mask part. In other words, a single mask part may include a plurality of light-transmissive design portions, namely, light-transmissive design portions 411 to 414.

Although the display device and the input device according to one or more aspects of the present disclosure have been described above based on the embodiment, the present disclosure is not limited to the above-described embodiment. Other forms in which various modifications apparent to those skilled in the art are applied to the embodiments, or forms structured by combining structural components of different embodiments may be included within the scope of one or more aspects of the present disclosure, unless such changes and modifications depart from the scope of the present disclosure.

While an embodiment has been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: Japanese Patent Application No. 2017-212708 filed on Nov. 2, 2017.

INDUSTRIAL APPLICABILITY

The present disclosure is useful as a display device, an input device, etc., which are capable of effectively displaying a plurality of designs with a simple configuration.

What is claimed is:

1. A display device, comprising:
a guided-light source which comprises a first guided-light source that emits first light to be guided; and
a light guide body which guides the first light emitted by the first guided-light source, wherein
the light guide body includes:
a first light guide leg which includes a first light entrance surface facing the first guided-light source, and guides the first light emitted by the first guided-light source and entering the first light guide leg through the first light entrance surface; and a light exit portion which has a plate shape, is connected at an angle to the first light guide leg, and includes a first reflection design portion which reflects, in a first direction, a portion of the first light guided by the first light guide leg and a second reflection design portion which reflects, in the first direction, an other portion of the first light guided by the first light guide leg, the light exit portion includes a first connecting portion connected to the first light guide leg, the first reflection design portion is disposed in a first region of the light exit portion when viewed in the first direction, the first region being located on a second direction side with respect to the first connecting portion, and the second reflection design portion is disposed in a second region of the light exit portion when viewed in the first direction, the second region being located on a third direction side with respect to the first connecting portion, the third direction side being different from the second direction side.

2. The display device according to claim 1, wherein the light exit portion has an opening between the first region and the second region.

3. The display device according to claim 1, wherein the first light guide leg includes:

a first portion which includes a first reflection surface crossing a second direction when viewed in the first direction, and guides the portion of the first light entering the first light guide leg through the first light entrance surface to the first region of the light exit portion, by causing the first reflection surface to reflect the portion of the first light; and a second portion which includes a second reflection surface crossing a third direction when viewed in the first direction, and guides the other portion of the first light entering the first light guide leg through the first light entrance surface to the second region of the light exit portion, by causing the second reflection surface to reflect the other portion of the first light.

4. The display device according to claim 3, wherein the first reflection surface is disposed across the second reflection surface from the second reflection design portion in the third direction, and the second reflection surface is disposed across the first reflection surface from the first reflection design portion in the second direction.

5. The display device according to claim 1, wherein the guided-light source further comprises a second guided-light source that emits second light to be guided, the light guide body further includes a second light guide leg connected at an angle to the light exit portion, across the first region of the light exit portion from the first light guide leg, and the second light guide leg includes a second light entrance surface facing the second guided-light source, and guides the second light emitted by the second guided-light source and entering the second light guide leg through the second light entrance surface, to the first region of the light exit portion.

6. The display device according to claim 1, further comprising:

a mask body which faces the light exit portion, and includes (i) a light-transmissive design portion that transmits light and (ii) a light-blocking portion that is a remaining portion of the mask body and blocks light;

a direct-light source which emits light toward the mask body in the first direction; and a control circuit which selectively causes the guided-light source and the direct-light source to emit light.

7. The display device according to claim 6, wherein the light-transmissive design portion disposed on the mask body overlaps with any one of reflection design portions including the first reflection design portion and the second reflection design portion and disposed on the light exit portion.

8. An input device, comprising:

the display device according to claim 1; and a switch which outputs a signal in response to pressing on (i) reflection design portions including the first reflection design portion and the second reflection design portion and disposed on the light guide body or (ii) a light-transmissive design portion disposed on a mask body.

9. The input device according to claim 8, wherein (i) designs corresponding to the reflection design portions or (ii) a design corresponding to the light-transmissive design portion is selectively displayed, and the switch outputs a different signal according to whether the designs corresponding to the reflection design portions are displayed or the design corresponding to the light-transmissive design portion is displayed.

10. The input device according to claim 8, further comprising:

a control circuit which causes (i) designs corresponding to the reflection design portions or (ii) a design corresponding to the light-transmissive design portion to be selectively displayed, wherein the control circuit receives the signal output by the switch in response to the pressing, as input which differs according to whether the designs corresponding to the reflection design portions are displayed or the design corresponding to the light-transmissive design portion is displayed.

11. A display device, comprising:

n guided-light sources which are disposed in an annular shape, and emit light to be guided; and a light guide body which guides the light emitted by the n guided-light sources, wherein the light guide body includes:

n light guide legs which include n light entrance surfaces facing the n guided-light sources, and each of which guides light entering the light guide leg through a corresponding one of the n light entrance surfaces; and a light exit portion which has a plate shape, is connected at an angle to each of the n light guide legs, and includes (i) n reflection design portions that reflect, in a first direction, light guided by the n light guide legs and (ii) n connecting portions connected to the n light guide legs, the n reflection design portions and the n connecting portions being disposed alternately in an annular shape, each of the n light guide legs includes (i) a first reflection surface which reflects a portion of light emitted by a corresponding one of the n guided-light sources, to one of two reflection design portions which are among the n reflection design portions and adjacent to each other across a corresponding one of the n connecting portions, and (ii) a second reflection surface which reflects an other portion of the light to the other of the two reflection design portions, and each of the n reflection design portions of the light exit portion reflects, in the first direction, light reflected by the first reflection surface of a light guide leg which is among the n light guide legs and corresponds to one of two connecting portions that are adjacent to the reflection design portion among the n connecting portions, and light reflected by the second reflection surface of a light guide leg which is among the n light guide legs and corresponds to an other of the two connecting portions.

12. The display device according to claim 11, wherein the light exit portion has an opening located inside the annular shape in which the n reflection design portions are disposed.

13. The display device according to claim 11, further comprising:
- a mask body which faces the light exit portion, and includes (i) a light-transmissive design portion that transmits light and (ii) a light-blocking portion that is a remaining portion of the mask body and blocks light;
- a direct-light source which emits light toward the mask body in the first direction; and
- a control circuit which selectively causes the guided-light source and the direct-light source to emit light.

14. The display device according to claim 13, wherein the light-transmissive design portion disposed on the mask body overlaps with any one of the n reflection design portions disposed on the light exit portion.

15. An input device, comprising:
the display device according to claim 11; and
a switch which outputs a signal in response to pressing on (i) the n reflection design portions disposed on the light guide body or (ii) a light-transmissive design portion disposed on a mask body.

16. The input device according to claim 15, wherein
(i) designs corresponding to the n reflection design portions or (ii) a design corresponding to the light-transmissive design portion is selectively displayed, and
the switch outputs a different signal according to whether the designs corresponding to the n reflection design portions are displayed or the design corresponding to the light-transmissive design portion is displayed.

17. The input device according to claim 15, further comprising:
a control circuit which causes (i) designs corresponding to the n reflection design portions or (ii) a design corresponding to the light-transmissive design portion to be selectively displayed, wherein
the control circuit receives the signal output by the switch in response to the pressing, as input which differs according to whether the designs corresponding to the n reflection design portions are displayed or the design corresponding to the light-transmissive design portion is displayed.

* * * * *